United States Patent
Donahue-Yan et al.

(10) Patent No.: US 8,381,368 B2
(45) Date of Patent: Feb. 26, 2013

(54) VEHICLE CLIP CENTERING DEVICE AND METHOD

(75) Inventors: Haithi Donahue-Yan, Columbus, OH (US); Shinichi Yamase, Dublin, OH (US); James Seale, Jr., Delta, AL (US)

(73) Assignee: Honda Motor Co., Ltd., Tokyo (JP)

( * ) Notice: Subject to any disclaimer, the term of this patent is extended or adjusted under 35 U.S.C. 154(b) by 592 days.

(21) Appl. No.: 12/418,976

(22) Filed: Apr. 6, 2009

(65) Prior Publication Data

US 2009/0249587 A1  Oct. 8, 2009

Related U.S. Application Data

(60) Provisional application No. 61/042,688, filed on Apr. 4, 2008.

(51) Int. Cl.
*B60R 13/02* (2006.01)

(52) U.S. Cl. ........... 24/297; 24/289; 24/581.1; 411/339; 411/373; 411/510; 296/146.7; 296/217

(58) Field of Classification Search .................... 24/289, 24/297, 581.1; 411/339, 373, 510; 296/146.7, 296/216
See application file for complete search history.

(56) References Cited

U.S. PATENT DOCUMENTS

| 2,238,865 | A |   | 4/1941  | Purinton |   |
|-----------|---|---|---------|----------|---|
| 4,568,215 | A |   | 2/1986  | Nelson |   |
| 4,717,301 | A |   | 1/1988  | Oddenino |   |
| 5,319,839 | A | * | 6/1994  | Shimajiri | ........................ 24/453 |
| 5,507,610 | A | * | 4/1996  | Benedetti et al. | ............. 411/339 |
| 6,196,607 | B1 |  | 3/2001  | Gulisano |   |
| 6,234,558 | B1 |  | 5/2001  | Curtindale |   |
| 6,572,317 | B2 | * | 6/2003 | Okada et al. | ................... 411/508 |
| 6,594,870 | B1 | * | 7/2003 | Lambrecht et al. | ............. 24/297 |
| 6,604,780 | B2 | * | 8/2003 | Lee | ............................... 296/192 |
| 7,178,855 | B2 |  | 2/2007  | Catron et al. |   |
| 7,213,378 | B2 |  | 5/2007  | Randez Perez et al. |   |
| 2003/0230044 | A1 | * | 12/2003 | Peterson | ....................... 52/716.5 |
| 2004/0083583 | A1 | * | 5/2004  | Bradley et al. | ................... 24/297 |
| 2006/0017306 | A1 | * | 1/2006  | Smith et al. | ................ 296/146.7 |
| 2006/0197356 | A1 | * | 9/2006  | Catron et al. | ............. 296/146.7 |
| 2007/0046073 | A1 |   | 3/2007  | Ludwig et al. |   |
| 2007/0107174 | A1 | * | 5/2007  | Bordas | ............................. 24/664 |
| 2007/0107347 | A1 |   | 5/2007  | Haynes et al. |   |
| 2008/0052878 | A1 | * | 3/2008  | Lewis et al. | ..................... 24/297 |
| 2008/0298890 | A1 | * | 12/2008 | Koike | ........................ 403/408.1 |

* cited by examiner

*Primary Examiner* — Robert J Sandy
*Assistant Examiner* — David Upchurch
(74) *Attorney, Agent, or Firm* — Kenealy Vaidya LLP; Mark E. Duell

(57) ABSTRACT

A centering clip device can include a clip base having an opening for receiving a clip. The clip base can have a top surface that has a first bump, a second bump and a third bump all spaced away from each other. A clip can be included that has a substantially elongated body, a bottom flange formed on a bottom end of the clip, a top flange, an annular slot formed between the top flange and the bottom flange, and an umbrella structure. The top flange may also be formed as an umbrella structure having an inclined camming surface formed on its lower surface. The clip base can be configured to releasably engage the clip within the clip base. The camming surface can be biased against the first, second and third bumps to center the clip within the clip base, and permit connection between a first vehicle component, such as a roofliner, to a second vehicle component, such as a roof frame.

22 Claims, 6 Drawing Sheets

VEHICLE CLIP CENTERING DEVICE AND METHOD

This application and invention claims the priority benefit under 35 U.S.C. §119 of U.S. Provisional Patent Application No. 61/042,688 filed on Apr. 4, 2008, which is hereby incorporated in its entirety by reference.

BACKGROUND

1. Field

The presently disclosed subject matter relates to fasteners and, more particularly, to an improved fastening structure for securing various vehicle components.

2. Brief Description of the Related Art

A number of different fasteners exist for attaching components, including vehicle components, to support panels. For example, in the automotive industry, various components, such as vehicle interior trim panels, are attached to structural supports which can be made of sheet metal, polymeric materials or composite materials. A common problem with such conventional fastening devices has been that, during assembly, alignment of the fasteners with the apertures provided in the components that are to be attached to can be difficult. As a result, misaligned fasteners or clips cause poor coupling of components which may overstress both the fastener/clip and the components to be coupled, resulting in a loss in retention strength for holding the components in place and/or destruction of the fastener or associated clip(s) and housings. As a result, components can become loose or rattle because of improper fastener geometry or installation.

Some fasteners are of a two-piece construction including a pin and a mounting grommet which allows a component once installed to be removed and reattached by a separating joint between the pin and grommet. In such configurations, a socket or aperture in each of the mating vehicle components that are to be attached are provided for receiving the pin and mounting grommet assembly. One type of socket is commonly referred to as a "doghouse" which receives the grommet end of the fastener. In such conventional structures, there has been difficulty centering the pin and grommet within the socket structure. Sometimes, the pin is forced to an edge of the socket which results in an off-centered pin which in turn compromises the integrity of any coupling of components by the pin and grommet structure. In addition, when lock structures are provided at the doghouse structure to retain the grommet portion of the fastener locked within the doghouse structure, depending on the size of the lock structures and the geometry of the grommet portion, the lock structure may contact and cause misalignment of the fastener.

Thus, it would be desirable to provide a clip centering device and method which centers a fastener within a connection (e.g., doghouse clip) structure resulting in an improved coupling of components, particularly vehicle components.

SUMMARY

According to one example, a clip includes a pin portion that has a locking structure at one end, an annular recess between two flanges at an opposite end, and an umbrella portion located between the locking structure and the flanged annular recess portion. The clip is specifically configured to attach the headliner or roofliner of a vehicle to the vehicle's upper frame, body panel or roof bracket. The headliner or roofliner includes plastic injected support parts molded into a back surface thereof to provide clipping structures, support, and impact protection to the roofliner. The clipping structures have typically been formed as "doghouse" structures that include a keyhole that allows plastic lips (e.g., the annular flanged portion of the clip) to be inserted and connected thereto. The locking structure of the clip is then attached to a body panel, bracket, or other vehicle roof frame structure. In the related art, the doghouse clip structure is relatively large and includes two bumps located relatively close to the keyhole in the doghouse structure. The two bumps function to retain the clip within the keyhole in the doghouse structure. In other words, the bumps are located in front of the umbrella structure of the clip and only contact the umbrella structure when the clip moves towards the keyhole in a removal motion. In order to meet certain design requirements, the doghouse structure that is molded into the back surface of roofliners may be required to be reduced in size. As the doghouse structure is reduced in size, the bumps which were previously located in front of the umbrella structure of the clip may be located underneath the umbrella structure (and/or flanged annular portion) after attachment of the clip to the doghouse structure (and to the vehicle roof bracket, frame, etc.). Thus, these two bumps may cause misalignment of the clip with respect to the doghouse structure. In addition, this type of fastener or clip may not install properly, may damage a frame plate that it is to be attached to, and the clips or fasteners themselves may be damaged due to the misalignment.

The disclosed subject matter addresses at least some of the drawbacks of conventional fastener systems by providing an assembly that centers a clip within a clip base so that components can be releasably coupled to each other in a manner that also reduces and/or eliminates rattling, vibration, and/or noise caused by poor coupling of components. The centering clip device according to the disclosed embodiments can provide a light-weight, low cost solution that can be implemented in a variety of situations requiring the coupling of two components.

According to an aspect of the disclosed subject matter, a centering clip device for coupling at least two components is provided which includes a clip base, the clip base including an opening for receiving a clip, a top surface and a first bump, a second bump and a third bump spaced away from each other and formed on the top surface and a clip having a substantially elongated body, a bottom flange portion formed on the bottom end of the clip, a top flange portion, an annular slot formed between the top flange portion and the bottom flange portion and an umbrella structure formed over the top flange portion, wherein the clip base is capable of releasably engaging and centering the clip.

According to another aspect of the disclosed subject matter, a second end of the clip includes a locking end having a funnel shape.

According to another aspect of the disclosed subject matter, a diameter of the annular slot is smaller than a diameter of the top and bottom flange portions.

According to another aspect of the disclosed subject matter, the umbrella portion has an inclined camming surface which is biased against the first, second and third bumps to center the clip within the base.

According to another embodiment of the disclosed subject matter, the top flange portion also includes an inclined camming surface which, together with the inclined camming surface of the umbrella portion, bias against the first, second and third bumps to center the clip within the clip base.

According to another aspect of the disclosed subject matter, a method for centering a clip with a clip fastening structure is provided which includes providing a clip base having an opening for receiving a clip, a top surface and a first bump, a second bump and a third bump spaced away from each other and formed on the top surface, providing a clip having a top flange portion, a bottom flange portion, a locking end, an umbrella portion and an annular slot formed between the top and bottom flange portions, the umbrella portion including an inclined camming surface and biasing the inclined camming surface against the first, second and third bumps so that the clip is centered within the clip base.

According to one embodiment, the clip centering device is used to fasten a vehicle roofliner or headliner to the roof of a vehicle. In this embodiment, the clip base may be formed integrally with a bracket that is coupled to a roofliner made of a semi-rigid material. The locking end of the clip may lockably engage the roof of the vehicle so that the roofliner is coupled with the roof.

According to another aspect of the disclosed subject matter, a centering clip system for coupling at least a first vehicle component to a second vehicle component can include a clip having a top end and a bottom end, a bottom flange located at the bottom end of the clip, a top flange located adjacent the bottom flange and defining an annular slot between the top flange and the bottom flange, an umbrella structure located between the top end of the clip and the top flange; a clip base including a side surface, a top surface, and an opening in the side surface and top surface configured to receive the clip, the top surface including a first bump, a second bump and a third bump spaced away from each other and located about the opening in the top surface of the clip base, wherein the opening in the clip base is configured to releasably engage the clip within the opening, and the first bump, second bump and third bump are configured to center the clip within the opening of the clip base.

According to another aspect of the disclosed subject matter, a centering clip system for coupling at least a first vehicle component to a second vehicle component can include a clip having a top end and a bottom end, a bottom flange located at the bottom end of the clip, a second umbrella structure located adjacent the bottom flange and defining an annular slot between the second umbrella structure and the bottom flange, a first umbrella structure located between the top end of the clip and the second umbrella structure; a clip base including a side surface, a top surface, and an opening in the side surface and top surface configured to receive the clip, the top surface including a first bump, a second bump and a third bump spaced away from each other and located about the opening in the top surface of the clip base, wherein the opening in the clip base is configured to releasably engage the clip within the opening, and the first bump, second bump and third bump are configured to center the clip within the opening of the clip base.

According to yet another aspect of the disclosed subject matter a method for coupling a first vehicle component to a second vehicle component, can include providing a clip having a top end and a bottom end, a bottom flange located at the bottom end of the clip, a top flange located adjacent the bottom flange and defining an annular slot between the top flange and the bottom flange, an umbrella structure located between the top end of the clip and the top flange and including a camming surface; providing the first vehicle component with a clip base having a side surface, a top surface, and an opening in the side surface and top surface configured to receive the clip, the top surface including a first bump, a second bump and a third bump spaced away from each other and located about the opening in the top surface of the clip base; inserting the clip into the opening in the clip base; biasing the camming surface of the umbrella structure against the first, second and third bumps so that the clip is centered within the clip base; and attaching the clip to the second vehicle component Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
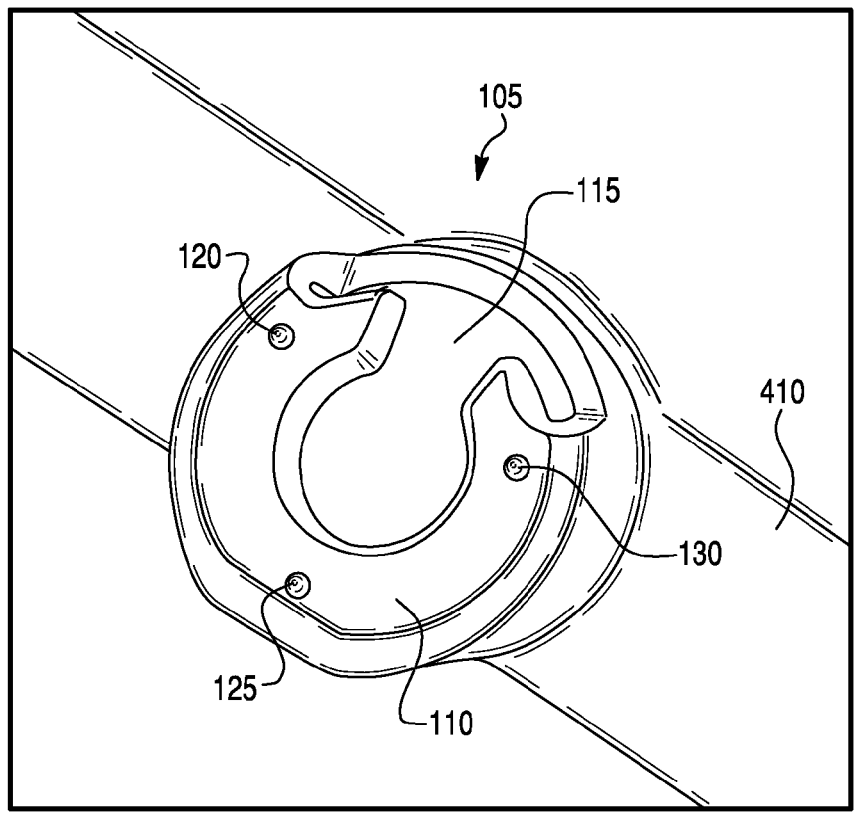
FIG. 1 illustrates a perspective view of a clip base in accordance with principles of the disclosed subject matter.

The disclosed subject matter provides a centering clip device and method for use in a vehicle that allows vehicle components to be firmly affixed to one another so as to minimize rattling, vibration, and/or noise caused by the poor coupling of components. The disclosed subject matter is particularly suited for attaching roofliners or other vehicle panels to a frame or other attachment component within the vehicle. Specifically, the disclosed subject matter facilitates roofliner attachment to the roof frame in those portions of the roof frame that are especially narrow, such as in the area surrounding a sunroof, moonroof, etc.

Referring to the drawing figures, like reference numerals designate identical or corresponding elements throughout the several figures.

FIG. 1 illustrates a perspective view of a clip base 105 of a centering clip device according to the principles of the disclosed subject matter. FIG. 1 shows the clip base 105 having a generally circular shape and an opening 115 that is shaped to include a slit and an aperture transverse to the slit such that a clip (not shown in FIG. 1) can be received through the slit and then releasably engaged in the aperture. This structure is sometimes referred to as a doghouse structure. A first extension structure or bump 120 is formed along a top surface 110 of the clip base 105. A second bump 130 and a third bump 125 are also formed on the top surface 110 of the clip base. As shown in FIG. 1, in this embodiment, the bumps 120 and 130 are formed near the slit portion of the opening 115, while the bump 125 is spaced away from the bumps 120 and 130 and is formed in a rear section of the clip base 105. The clip base 105 can be formed integrally with a support member/bracket (stiffner) 410. For example, in one embodiment, the bracket 410 may be connected to, or formed integrally with, a vehicle headliner that is connected to the roof of a vehicle. As will be described in greater detail below, a clip 150 may be releasably engaged within the clip base 105 and centered using the bumps 120, 125 and 130 thus forming a centering clip device which can be used to connect two components together.

Figure 2:
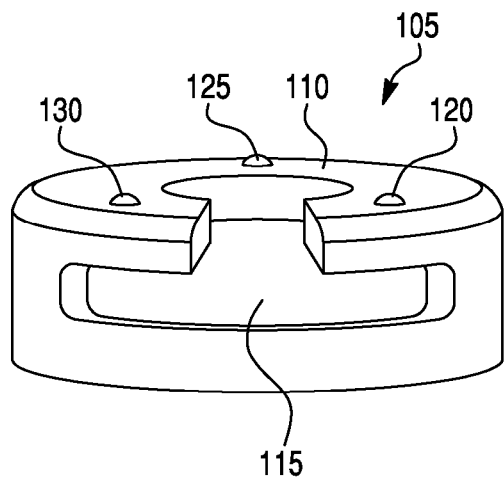
FIG. 2 shows a front side view of the clip base of FIG. 1.

FIG. 2 shows a front view of the clip base 105 of FIG. 1. Bumps 120, 125 and 130 are shown as being formed on the top surface 110 of the clip base 105. The clip base 105 also includes the opening 115 capable of receiving a clip 150 (not shown in FIG. 2). The clip 150 can be inserted into and releasably engaged within the doghouse structure of the clip base 105.

The bumps 120, 125 and 130 can be configured to center the clip base 105 within the top surface aperture of the opening 115 by either "camming" against various surfaces of the clip 150 to keep it centered or locking against those various surfaces of the clip 150. The various surfaces of the clip can be symmetrically positioned about the top surface aperture of the opening 115 to center the clip 150. In addition, a surface of the clip 150 can contact each of the spaced apart bumps 120, 125 and 130 in such a manner that prevents the clip from moving too far in any one direction. In this manner, the clip can be substantially centered.

Figure 3:
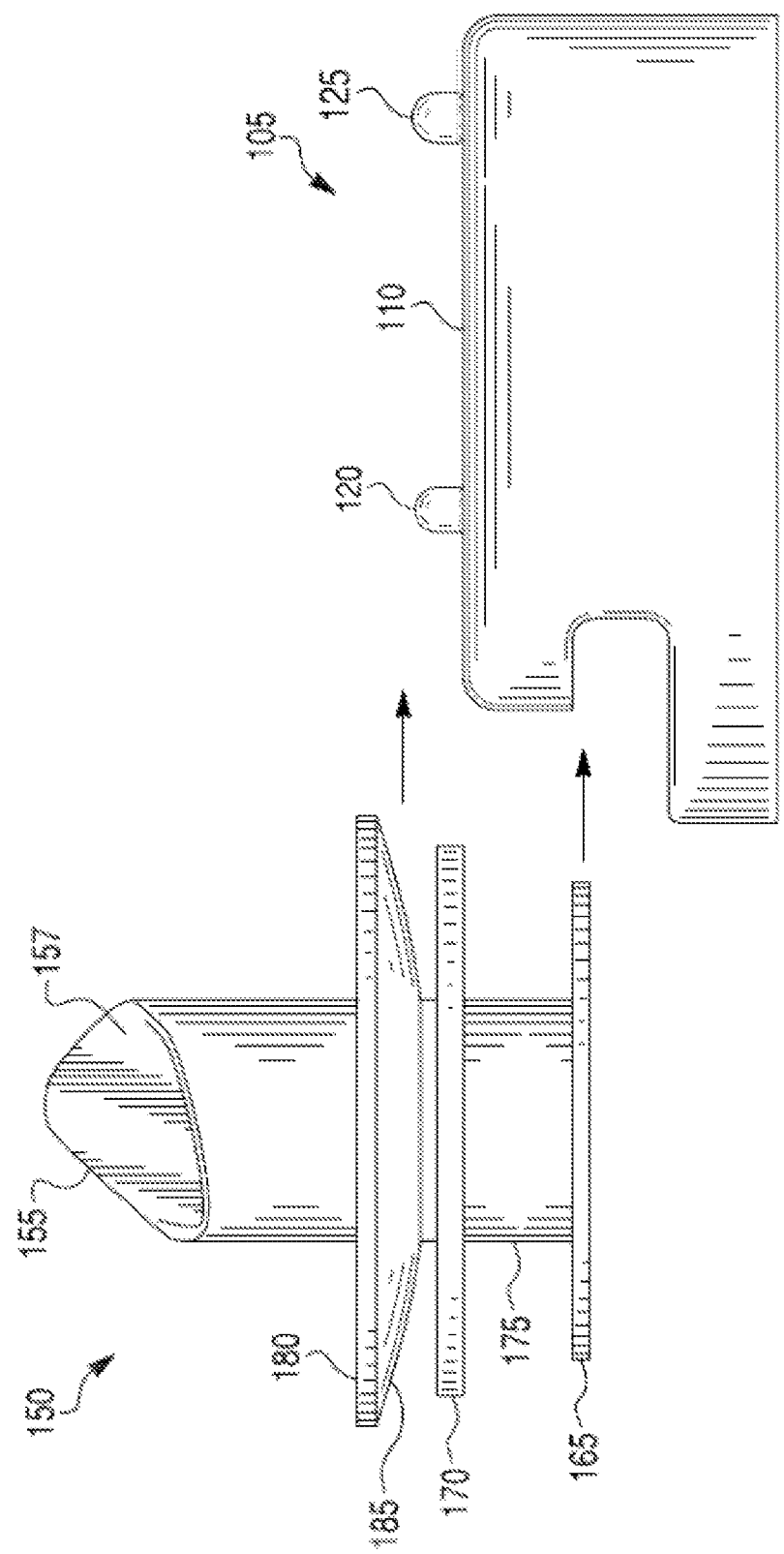
FIG. 3 shows a schematic side view of a centering clip device according to the disclosed subject matter.

FIG. 3 shows a schematic side view of the embodiment of the centering clip device as shown in FIG. 1 with the clip base 105 and clip 150 shown in a position prior to the clip 150 being fitted within the clip base 105. FIG. 3 shows the clip base 105 having bumps 120 and 125 formed on the top surface 110. The third bump 130 is not visible in FIG. 3. The opening 115 formed in the clip base 105 structure for receiving the clip 150 is also shown. FIG. 3 also shows that the clip 150 has a generally elongated cylindrical body and includes a locking end 155 having a funnel shape for mating with an appropriate connection structure (i.e., a vehicle body frame, vehicle body panel, etc.). A locking structure 157 can be formed integral with the locking end 155 to facilitate mating with the appropriate connection structure. The locking structure 157 in this embodiment includes two arcuate arms (arcuate as viewed from a top view position) that can flex toward each other during insertion into an aperture in the appropriate connection structure (see for example, aperture 430 shown in FIG. 4). The arms then spring back to their original position when fully inserted through the aperture to cause the locking end 155 to be locked within the aperture of the appropriate connection structure.

The clip 150 also includes an outwardly extending top flange 170. The top flange 170 may be configured in such a manner that it can be disposed above the top surface 110 of the clip base 105 when inserted/locked within the opening 115 therein. A bottom flange 165 can be located at the base of the clip 150 to form an annular slot 175 between the bottom flange 165 and the top flange 170. When connected, the bottom flange 165 of the clip 150 is located below the top surface 110 of the clip base 105 to sandwich a portion of the clip base 105 between the top flange 170 and bottom flange 165. An umbrella portion 180 can also be formed over the top flange 170. The umbrella portion 180 may be made of a flexible material capable of applying a spring force between the roof frame (see for example, roof frame 420 of FIG. 4) and the clip 150, clip base 105 and in turn between the roof frame and the roofliner. Thus, the umbrella portion 180 acts as a positioner and damper, and prevents the clip 150 (and roofliner 410) from being moved too far in either the insertion or extrusion direction with respect to the roof frame.

The outer diameter of the annular slot 175 can be smaller than the outer diameter of each of the top flange 170, the umbrella 180 and the bottom flange 165 (all diameters being referenced from a top position with respect to the drawing Figures). This allows the clip 150 to float slightly in the doghouse structure of the clip base 105 when the clip 150 is inserted into the clip base 105 via the opening 115. This float permits easy alignment and insertion of the clip 150 into the clip base 105, and allows for some "play" or margin of adjustment during installation of the roofliner into the roof frame. This margin of adjustment permits the components that are to be attached to be made with less precision which can reduce costs to some degree and ease manufacturing processes, etc. In this embodiment, the bumps 120, 125 and 130 engage the bottom portion of the umbrella 180, and particularly the camming surface 185 of the umbrella 180, to move and center the clip 150 within the clip base 105. In particular, the positioning of the bumps 120, 125 and 130 prevents the clip 150 from moving too far in any one direction and/or can continuously position the clip 150 to ensure that it is aligned with the top aperture in the opening 115 of the clip base 105. The entire clip 150 is releasably engaged within slit in the opening 115 the clip base 105. This permits both easy alignment and insertion of the clip 150 into the clip base 105.

In practice, a manufacturer may separately manufacture the clip 150 and the clip base 105. The clip 150 and clip base 105 can be used to connect various components, such as a vehicle headliner to a vehicle roof. For example, the clip base 105 may be integrally formed within a bracket that holds a headliner component. The clip 150 may be inserted into the clip base 105 and the locking end 155 of the clip 150 can be inserted and pressed into another component having an aperture so that the two components can be coupled. The sharp taper of the locking end 155 allows the clip 150 to be easily inserted into an opening provided by a component to be connected. The camming surfaces 185 of the umbrella 180 and the bumps 120, 125 and 130 act to center the entire clip 150, including the bottom flange 165, within the clip base 105.

Figure 4:
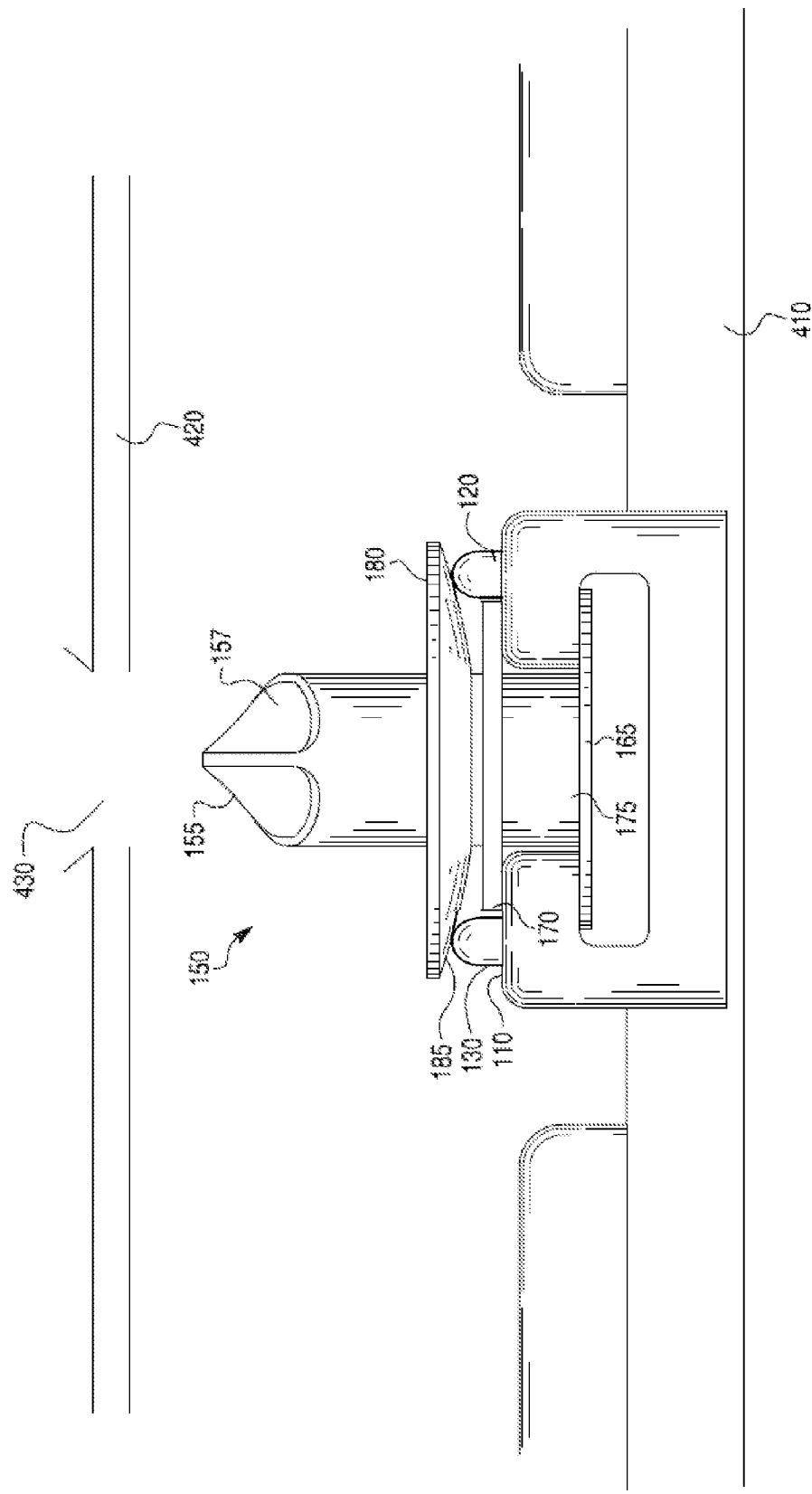
FIG. 4 shows a front schematic view of the centering clip device of FIG. 3 in the process of attachment to a roof frame structure.

FIG. 4 shows a side view of the centering clip device in which the clip 150 is fitted within the clip base 105. The clip base 105 includes the top surface 110 and bumps 120 and 130 formed on the top surface. The third bump 125 is also formed on a rear portion of the top surface 110 but is not visible in FIG. 4. The clip 150 is fitted into and releasably engaged by the clip base 105 via the opening 115. The clip 150 includes the locking end 155 which has a funnel shape capable of mating with other structures. As indicated above, the clip 150 can include an outwardly extending top flange 170, and bottom flange 165 which in this embodiment forms the base of the clip 150. The annular slot 175 is formed between the bottom flange 165 and the top flange 170. The umbrella 180 is formed over the top flange 170 and has an inclined camming surface 185 (shown in FIG. 3). The outer diameter of the annular slot 175 is smaller than the outer diameter of the top flange 170 and the bottom flange 165, and can also be slightly wider than a portion of the slit portion of the opening 115. Thus, the clip 150 can be snap fit into the doghouse/opening 115 structure of the clip base 105 and retained therein. The inclined camming surface 185 (shown in FIG. 3) of the umbrella 180 in this embodiment makes contact with the bumps 120, 125 and 130 and acts to center the clip 150 within the clip base 105. The clip 150 also floats slightly in the doghouse structure of the clip base 105, as described above. The clip base 105 can be formed integrally with a bracket 410. The bracket 410 may be a part of or may be coupled to a first component (e.g., a roofliner) that is to be joined together with a portion of the vehicle frame, vehicle body panel, etc. For example, the bracket 410 may be coupled to a vehicle headliner or roofliner that may be made of a semi-rigid substrate material having a visible topcoat treatment. FIG. 4 also shows a roof frame 420 of a vehicle having an aperture 430 for lockably receiving the locking end 155 of the clip 150. In this manner, a roofliner can be firmly coupled to the roof frame 420 of a vehicle. In one embodiment, the top flange 170 can be configured in such a manner to form a seal between the roofliner and the remaining portions of the centering clip device.

Figure 5:
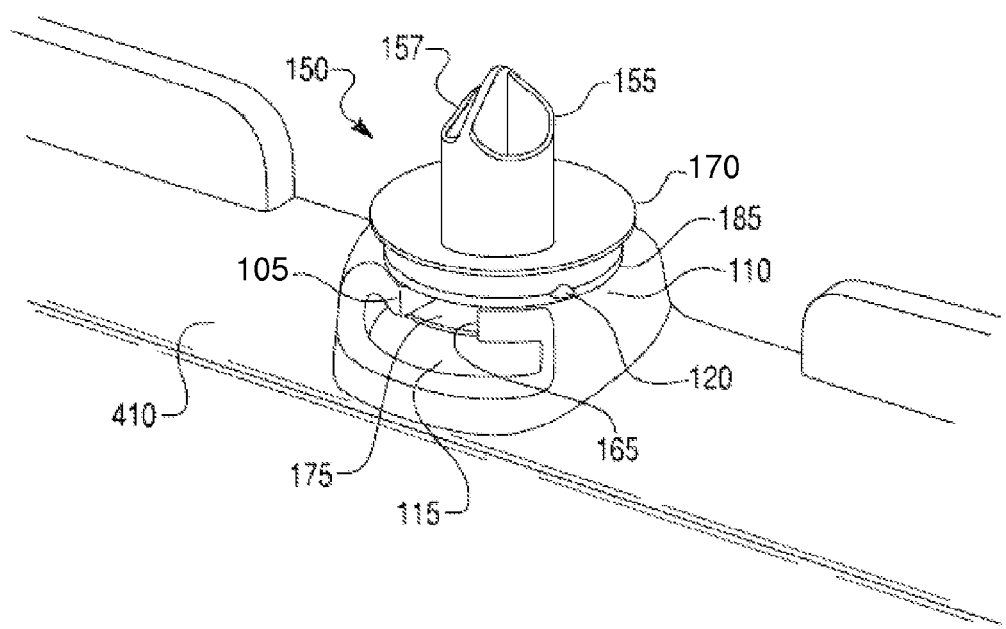
FIG. 5 is a perspective view of the centering clip device of FIG. 4.

FIG. 5 shows a perspective view of the centering clip device in which the clip 150 is fitted within the clip base 105. The clip base 105 in this embodiment is formed integrally with the bracket 410. As described above, the bracket 410 may be connected to a component such as a vehicle headliner. As shown, the bumps 120, 125, 130 formed on the top surface 110 of the clip base 105 assist with the centering of the clip 150 when the clip 150 is fitted into and releasably engaged within the doghouse structure of clip base 105. The top flange 170 and the umbrella 180 of the clip 150 are positioned above the top surface 110 of the clip base 105 and the inclined camming surface 185 of the umbrella 180 is in contact with the bumps 120, 125 and 130. As described above, the bumps 120, 125 and 130 and camming surface 185 (shown in FIG. 3) ensure that the clip 150 does not move too far in any one direction and that the clip 150 is continuously centered within the clip base 105. The locking end 155 and integrally formed locking structures 157 are shown as located above the clip base 105 when the clip 150 is attached to the clip base 105. Thus, the clip 150 can be coupled to another component. In this manner, the bracket 410 and any structure coupled to the bracket, such a vehicle headliner, can be brought upward as a unit and coupled to another component, such as the roof of a vehicle.

Figure 6:
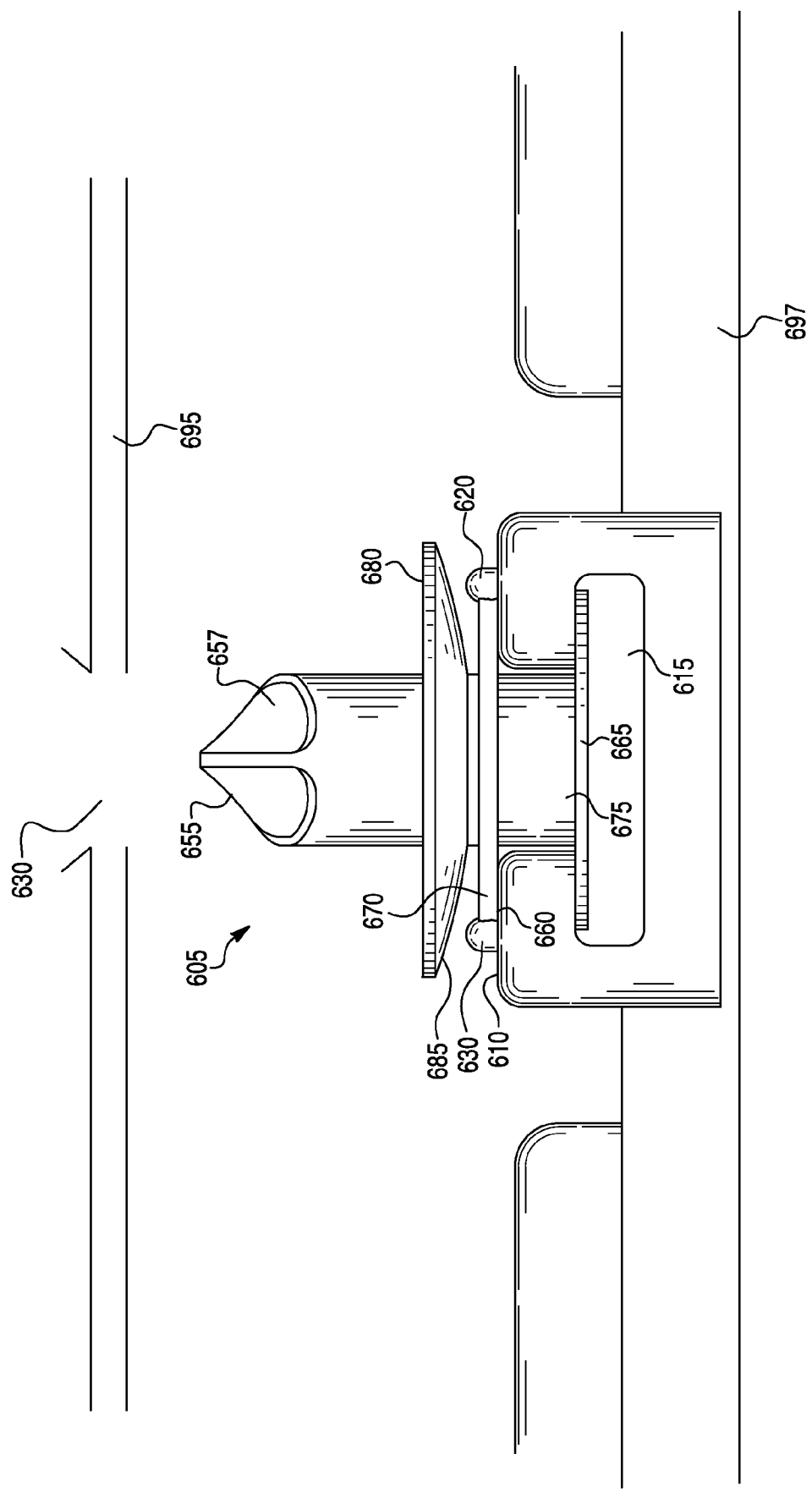
FIG. 6 is a front schematic view of another embodiment of a centering clip device in accordance with principles of the disclosed subject matter.

FIG. 6 shows a side view of the centering clip device according to another embodiment of the disclosed subject matter in which a clip 650 is fitted within a clip base 605. The clip base 605 can include a top surface 610 and bumps 620, 625 and 630 formed on the top surface. The third bump 625 is formed on a rear portion of the top surface 610 but is not visible in FIG. 6. The clip 650 can be fitted into and releasably engaged by the base clip 605 via an opening 615. The clip 650 includes a locking end 655 which has a funnel shape capable of mating with other structures. A locking structure 657 can be formed integrally with the locking end 655 and facilitates coupling of the clip 650 to other structures (and can have a similar design as that shown in the embodiment of FIGS. 1-5).

An outwardly extending top flange 670 of the clip 650 can include a first inclined camming surface 660. A bottom flange 665 can form the base of the clip 650 and define an annular slot 675 that is formed between the bottom flange 665 and the top flange 670. An umbrella portion 680 can be formed above the top flange 670 and can include a second camming surface 685 formed along a lower edge of the umbrella portion 680. The umbrella portion 680 may be made of a flexible material and is capable of applying a spring force between attached components (as described in more detail above with respect to the embodiments of FIGS. 1-5). The clip 650 and specifically the umbrella portion 680 of the clip 650 can be configured to act as a positioner or damper and can prevent the attached components from moving with too much velocity or range with respect to each other. In this embodiment, the first inclined camming structure 660 and the second inclined camming structure 685 both make contact with the bumps 620, 625 and 630 and act to center the clip 650 within the clip base 605. The clip 650 also floats slightly in the doghouse structure of the clip base 605. FIG. 6 also shows that the clip base 605 is formed integrally with a bracket 697. The bracket 697 may be a part of or may be coupled to a first component that is to be coupled to a second component. For example, the bracket 697 may be coupled to or formed with a vehicle headliner or roofliner that is to be connected to a roof frame 695 of the vehicle. More specifically, the roof frame 695 can be that narrow portion of the roof frame that surrounds or is adjacent to a sunroof or moonroof. The disclosed subject matter allows the clip base 605 (and base 105) to be miniaturized while also centering and locking the clip 650 (clip 150) within the base 605 (105) to allow narrow portions of the roofliner to be attached to the vehicle frame/bracket with confidence.

The roof frame 695 of the vehicle can include an aperture 630 for lockably receiving the locking end of the clip 650. In this manner, the roofliner can be firmly coupled to the roof 695 of the vehicle.

The bumps 620, 625, and 630 and camming structures 685 and 660 can be configured such that the bumps 620, 625, 630 contact and apply a force to the camming structure 685 primarily in a substantially vertical direction while the bumps 620, 625, 630 contact and apply a force to the camming structure 685 primarily in a horizontal direction (the vertical direction being the up and down direction in FIG. 6 while the horizontal direction being the left to right direction in FIG. 6). Of course, the camming structures 685 and 660 can also be configured differently to have surfaces that act or apply forces at different angles with respect to the bumps 620, 625, and 630 without departing from the spirit and scope of the disclosure.

Figure 7:
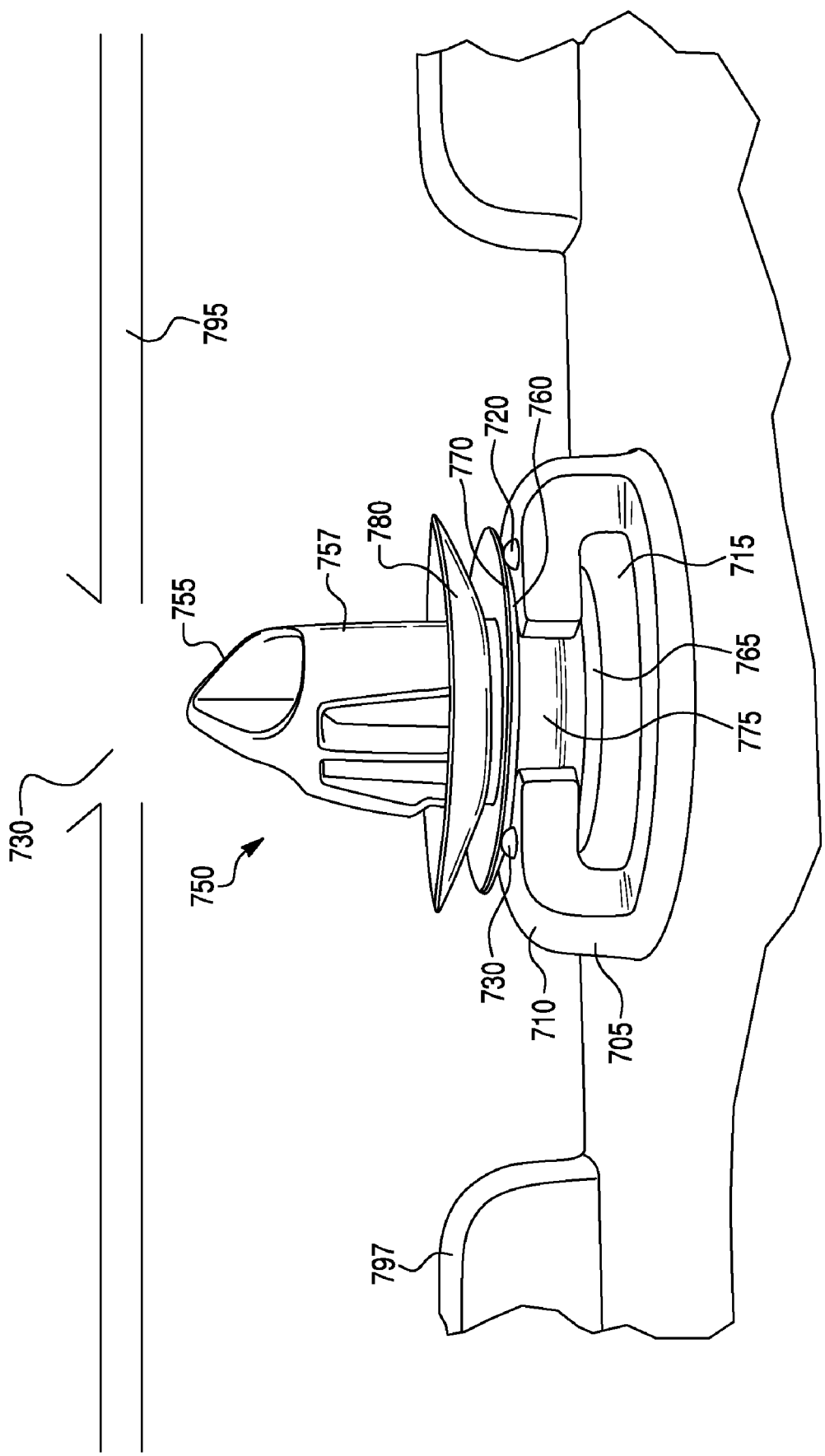
FIG. 7 is a front schematic view of another embodiment of a centering clip device in accordance with the principles of the disclosed subject matter.

FIG. 7 shows a side view of the centering clip device in accordance with another embodiment of the disclosed subject matter. FIG. 7 shows a clip 750 which is fitted within a clip base 705. The clip base 705 includes the top surface 710 and bumps 720 and 730 formed on the top surface 710. The third bump 725 is also formed on a rear portion of the top surface 710 but is not visible in FIG. 4. The clip 750 is fitted into and releasably engaged by the clip base 705 via the opening 715. The clip 750 includes the locking end 755 which has a funnel shape capable of mating with other structures. A locking structure 757 can also be formed integral with the locking end 755 to facilitate mating with the appropriate connection structure.

The clip 750 can include an outwardly extending second umbrella structure 770 and a bottom flange 765 which in this embodiment forms a base of the clip 750. The annular slot 775 is formed between the bottom flange 765 and the second umbrella structure 770. A first umbrella structure 780 is formed over the second umbrella structure 770. The second umbrella structure 770 also has an inclined camming surface 760 formed on its bottom surface. The outer diameter of the annular slot 775 is smaller than the outer diameter of the first and second umbrella structures 770 and 780 and the bottom flange 765 and can also be slightly wider than a slit portion of the opening 715. Thus, the clip 750 can be snap fit into the doghouse/opening 715 structure of the clip base 705 and retained therein. The inclined camming surface 760 of the second umbrella structure 770 in this embodiment makes contact with the bumps 720, 725 and 730 and acts to center the clip 750 within the clip base 705. The clip 750 also floats slightly in the doghouse structure of the clip base 705, as described above. The clip base 705 can be formed integrally with a bracket 797. The bracket 797 may be a part of or may be coupled to a first component (e.g., a roofliner) that is to be joined together with a portion of the vehicle frame, vehicle body panel, etc. For example, the bracket 797 may be coupled to a vehicle headliner or roofliner that may be made of a semi-rigid substrate material having a visible topcoat treatment.

FIG. 7 also shows a roof frame 795 of a vehicle having an aperture 730 for lockably receiving a locking end 755 of the clip 750. In this manner, a roofliner can be firmly coupled to the roof frame 795 of a vehicle. In one embodiment, the first or second umbrellas 770 and 780, respectively, can be configured in such a manner to form a seal between the roofliner and the remaining portions of the centering clip device.

The centering clip device according to the disclosed embodiments as described above provides an improved, highly reliable, easily installed fastening system which can prevent loose or broken clips or fasteners after installation and provide a firm and secure attachment between structures. The configuration of the centering clip device according to the disclosed embodiments also allows components to be easily coupled and un-coupled.

It should be noted that the disclosed structures that make up the centering clip device can be varied in terms of shape, size, material, connections, etc., without departing from the spirit and scope of the presently disclosed subject matter. For example, the clip base 105 may have a shape different than the generally circular shape described above. Similarly, the clip 150 may have a shape different than the generally elongate and cylindrical structure described above. Any shape capable of being fitted within and centered within the clip base is contemplated. Similarly, the clip base 105 and the clip 150 may be formed from a variety of materials, including but not limited to rigid plastics and/or polymeric materials, metals, composites, etc. The shape of the bumps 620, 625, and 630 is shown as being hemispherical. However, this shape can be different, and can include square, elliptic, non-symmetrical and other shapes that can provide the cam structure upon which the camming surfaces/structures of either the umbrella portion of flange portions follows. In addition, the disclosed subject matter is primarily directed to a roofliner attached to a roof frame in a vehicle, and more specifically to the roofliner portion that is located about a narrow attachment area such as around the perimeter of a sunroof. However, the invention is applicable in other vehicle component attachment structures in which a narrow attachment portion is provided.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of any of the aforementioned conventional art documents is incorporated by reference herein.

What is claimed is:

1. A centering clip system for coupling at least a first vehicle component to a second vehicle component, comprising:
   a clip having a top end and a bottom end, a bottom flange located at the bottom end of the clip, a top flange located adjacent the bottom flange and defining an annular slot between the top flange and the bottom flange, a first umbrella structure located between the top end of the clip and the top flange, wherein the first umbrella structure includes a first inclined camming surface;
   a clip base including a side surface, a top surface, and an opening in the side surface and top surface configured to receive the clip, the top surface including a first bump, a second bump and a third bump spaced away from each other and located about the opening in the top surface of the clip base, and spaced outside of and away from a periphery of the opening in the top surface, wherein the opening in the clip base is configured to releasably engage the clip within the opening, and the first inclined camming surface is biased against the first, second and third bumps when the clip is releasably engaged within the opening to center the clip within the clip base.

2. The centering clip system according to claim 1, wherein the top flange comprises a second umbrella structure.

3. The centering clip system according to claim 1, wherein the top end of the clip includes a locking structure configured to lock to the second vehicle component.

4. The centering clip system according to claim 2, wherein the second umbrella structures includes a second inclined camming surface.

5. The centering clip system according to claim 4, wherein at least one of the first inclined camming surface and the second inclined camming surface is biased against the first, second and third bumps when the clip is releasably engaged with the clip base to center the clip within the clip base.

6. The centering clip system according to claim 1, wherein the top flange includes a second inclined camming surface.

7. The centering clip system according to claim 6, wherein the second inclined camming surface is biased against the first, second and third bumps when the clip is releasably engaged with the clip base to center the clip within the clip base.

8. The centering clip system according to claim 1, wherein the first bump, second bump and third bump contact and apply force in a substantially vertical direction the first inclined camming surface of the first umbrella structure and contact and apply a force in a substantially horizontal direction to a second inclined camming structure of the top flange when the clip is releasably engaged with the clip base.

9. The centering clip system according to claim 1, wherein the opening includes a substantially slit shaped portion in the side surface of the clip base and an aperture portion in the top surface of the clip base, and the first bump and second bump are located between the slit shaped portion and aperture portion and the third bump is located behind the aperture portion such that the aperture portion is located between the first and second bumps and the third bump, and such that the third bump contacts the umbrella structure of the clip to prevent movement of the clip in an insertion direction into the clip base when the clip is releasably engaged with the clip base.

10. The centering clip system according to claim 2, wherein the locking structure is substantially funnel shaped.

11. The centering clip system according to claim 1, wherein the clip base is formed integrally with a bracket.

12. The centering clip system according to claim 11, wherein the bracket is coupled to a vehicle roofliner.

13. The centering clip system according to claim 2, wherein the locking structure is configured to be lockably received by a vehicle component.

14. The centering clip system according to claim 13, wherein the vehicle component is a vehicle roof.

15. The centering clip system according to claim 2, wherein at least one of the first and second umbrella structures is disposed over the first, second and third bumps when the clip is releasably engaged with the clip base.

16. A method for coupling a first vehicle component to a second vehicle component with the clip centering system as recited in claim 1, comprising:
   inserting the clip into the opening in the clip base;
   biasing a camming surface formed on at least one of the top flange and the first umbrella structure against the first, second and third bumps so that the clip is centered within the clip base; and
   attaching the clip to the second vehicle component.

17. The method according to claim 16, wherein the top flange includes a second umbrella structure having a camming surface formed on a surface of the second umbrella structure.

18. The method according to claim 16, wherein inserting the clip into the opening in the clip base includes releasably engaging the clip in the clip base.

19. The method according to claim 16, wherein providing a clip includes providing a second camming surface on the top flange, and
   inserting the clip into the opening in the clip base includes biasing the second inclined camming surface against the first, second and third bumps so that the clip is centered within the clip base.

20. The method according to claim 16, wherein attaching the clip to the second vehicle component includes providing a locking structure at the top end of the clip and locking the clip into an aperture in the second vehicle component.

21. The method according to claim 16, wherein the clip base is formed integrally with the first vehicle component, and the first vehicle component is a roof liner.

22. The method according to claim 16, wherein the first vehicle component is a roof liner and the second vehicle component is a narrow area of a vehicle roof frame surrounding an opening in the vehicle roof, and
   providing a clip includes providing a plurality of clips,
   attaching the clip to the second vehicle component includes attaching a plurality of clips to the second vehicle component, and further includes locking one of the clips to an aperture in the vehicle roof frame located along a first side of the opening in the vehicle roof, and locking at least another of the clips to another aperture in the vehicle roof frame located along a second side of the opening in the vehicle roof, the first side being directly opposed to the second side of the opening in the vehicle roof.

* * * * *